United States Patent Office 2,993,925
Patented July 25, 1961

2,993,925
FLUORINATED CARBINOXYSILANES AND POLYMERS THEREOF

Donald R. Husted, St. Paul, Minn., assignor to Minnesota Mining and Manufacturing Company, St. Paul, Minn., a corporation of Delaware
No Drawing. Filed Jan. 25, 1957, Ser. No. 636,247
12 Claims. (Cl. 260—448.8)

This invention relates to my discovery of a new and useful class of substituted silane compounds having novel properties, and polymers prepared therefrom.

The new compounds may be described as having the generic formula $(R_fCH_2O)_xSiX_{4-x}$, wherein $R_f$ represents a fluorocarbon radical (consisting only of fluorine and carbon atoms), X represents a halogen or a hydrolyzable nitrogen group, and $x$ is 1–4. Compounds in which $R_f$ in the above formula represents the perfluoropropyl radical $C_3F_7$— are exemplary of a presently preferred species of my novel substituted silane compounds, but the invention is not to be construed as limited to these specific examples.

The compunds of this invention are of interest for use in the field of surface chemistry due to the unusual properties which they impart to the surfaces of metals, cellulose, leather, and many other materials. Their action with respect to aluminum is particularly impressive. The compounds are valuable also as intermediates in the preparation of polymeric materials having novel and desirable optical as well as chemical and physical properties.

My new silicon halide compounds are conveniently prepared by mixing together a silicon tetrahalide and a 1,1-dihydroperfluoro alcohol, in proportions and at temperatures depending on the particular product desired, under substantially anhydrous conditions, and preferably in the presence of a volatile inert liquid solvent. The alcohol reacts to replace one, two, three or all of the halogen atoms of the silicon tetrahalide with fluorinated carbinoxy groups, with liberation of hydrogen halide. The product may be recovered in purified state by removal of the solvent followed by distillation or solvent extraction; or the crude reaction solution may be used without further purification. Amino groups may be subsituted for the halogen atoms attached to the silicon atom of these compounds, for example by introducing dry ammonia gas into a solution of the fluorinated carbinoxysilicon halide in an inert solvent, at low temperatures and under anhydrous conditions. Other analogous hydrolyzable nitrogen groups, e.g. methylamine, may be substituted for the halogen atoms in a comparable manner.

The fluorinated carbinoxysilicon halides and amines react with water or other hydroxyl-containing materials. Hydrolysis of the monomeric compounds with water produces hydroxyl-containing fluorinated carbinoxysilanes which dimerize or polymerize on standing, or more rapidly with moderate heating, with liberation of water. These halides and amines are also reactive with alcohols, reaction with polyalcohols in particular providing valuable polymeric products with liberation of HCl or $NH_3$. The amino compounds additionally are inter-reactive, forming dimeric or polymeric bodies, with liberation of ammonia, when heated.

In common with many fluorocarbon-based polymers, the polymeric bodies obtained in accordance with the foregoing have low refractive indices owing to the presence of the terminal fluorocarbon groups in the molecule, the index becoming lower as the relative size of the fluorocarbon groups is increased.

The 1,1-dihydroperfluorocarbinoxy groups impart to the substituted silane compound distinctive properties which differ from the properties of comparable hydrocarbinoxy silanes. The fluorocarbon chain is very stable and inert and is both hydrophobic and oleophobic, whereas a hydrocarbon chain is hydrophobic but oleophilic. The difference is significant with respect to the surface-active characteristics of the products, and particularly with those containing the perfluoropropyl group or higher perfluoro groups. The carbon-oxygen-silicon linkage in the compounds of my invention, for example in compounds such as bis (1,1-dihydroperfluorobutoxy) dichlorosilane or the diaminosilane obtained on aminolysis thereof, is resistant to hydrolysis, whereas the analogous linkage in dibutoxy dichlorosilane or diaminosilane is found to be readily hydrolyzed. Samples of cloth subjected to impregnation with, for example, bis (1,1-dihydroperfluorobutoxy) diamino silane, and heated for 10–15 minutes at 125° C., were found to be highly water-resistant. Treatment with di-tert-butoxy diamino silane provided a somewhat lower degree of water-resistance even though the product was heated for 4 hours or longer at 150° C. Di-n-butoxy diamino silane was still less effective.

My novel compounds are also useful in the surface treatment of metals. Thick coatings of various plastic materials have been applied to metal-to-metal joints for sealing purposes. For aircraft sealers designed to render leakproof the wing section fuel tanks of all-metal aircraft, certain fluorinated polymers are found to have desirable properties. However these polymers have heretofore been found defective in their adhesion to the aluminum wing surfaces. I hve found that a preliminary application of bis (1,1-dihydroperfluorobutoxy) dichlorosilane to the aluminum surface provides a highly effective bonding action between the metal and a subsequently applied coating of plastic fluorinated sealer material, such as a high-boiling plastic residue obtained during the preparation of perfluorobutylamine.

The preparation of typical fluorocarbon-containing silicon compounds exemplary of my invention will now be described.

Example 1

A glass flask is pre-dried by baking, is fitted with a reflux condenser, a dropping funnel, and a mechanical stirrer, and is then charged with 100 grams (0.5 mol) of dry normal 1,1-dihydroperfluorobutyl alcohol and 1200 ml. of anhydrous diethyl ether. To this is slowly added, by means of the dropping funnel, a solution of 55 grams (0.32 mol) of silicon tetrachloride in 600 ml. of ether, the flask being meanwhile cooled in a Dry Ice-acetone bath. Anhydrous conditions are maintained by means of conventional drying tubes. The mixture is stirred, allowed to stand until at room temperature, and then distilled, the distillation being completed under vacuum. The following four fractions are obtained:

1,1-dihydroperfluoro-n-butoxy trichlorosilane—B. 25–27° C./14 mm.

bis (1,1 - dihydroperfluoro-n-butoxy) dichlorosilane—B. 74–76° C./16 mm.

tris (1,1-dihydroperfluoro-n-butoxy) chlorosilane—B. 92–106° C./17 mm.

tetra (1,1-dihydroperfluoro-n-butoxy) silane—B. about 116° C./16 mm.

The proportion of chlorine remaining attached to the silicon is affected by the temperature of reaction and by the concentration of the reactants. Reaction at higher temperatures, or at higher concentrations, or in the presence of an acid acceptor such as pyridine or alpha-picoline, results in a higher degree of substitution, with correspondingly reduced recovery of di- or tri-chlorosilanes.

Compounds produced and isolated as above described were further analyzed for hydrolyzable chlorine and for fluorine and silicon content. In a typical analysis, the fraction designated as tris (1,1-dihydroperfluoro-n-butoxy) chlorosilane was found on analysis to contain 60.4 percent fluorine; the theoretical value, based on the formula $(C_3F_7CH_2O)_3SiCl$, is 60.5 percent. In another analysis, the fraction designated as bis (1,1-dihydroperfluoro-n-butoxy) dichlorosilane was found to contain 5.5–6.9 percent silicon and 14.5 percent chlorine; theoretical values, based on the formula $(C_3F_7CH_2O)_2SiCl_2$, are 5.64 percent silicon and 14.3 percent chlorine.

A chloro compound thus produced and separated by distillation ordinarily will be found to contain small proportions of one or more of the other named compounds. The compounds, either in pure or impure state, are suitable for the production of polymers, as will subsequently be shown.

Example 2

Anhydrous ammonia is introduced through a bubbler-tube into a solution of 9.75 grams of bis (1,1-dihydroperfluoro-n-butoxy) dichlorosilane, as obtained in Example 1, dissolved in 60 ml. of anhydrous ether, and cooled in a Dry Ice-acetone bath, until the ammonia is in excess. A white precipitate of ammonium chloride is formed during the addition of the ammonia. The mixture is allowed to warm up slowly, the ammonium chloride is filtered off, and the ether solution subjected to distillation, all under anhydrous conditions. There is recovered bis (1,1-dihydroperfluoro-n-butoxy) diaminosilane, B. 95–100° C./11 mm., and a polymeric residue containing a substantially lower percent of nitrogen and containing the Si—N—Si linkage.

Example 3

Trifluoroethanol, 1,1-dihydroperfluoroethanol $$CF_3CH_2OH$$

is reacted with silicon tetrachloride in anhydrous diethyl ether solution at low temperature, and the products separated by distillation, in accordance with the procedures of Example 1, to obtain the following fractions:

|  | Percent Cl | |
| --- | --- | --- |
|  | Analysis | Theory |
| trifluoroethoxy trichlorosilane, b. about 10°/15 mm. |  |  |
| bis (trifluoroethoxy) dichlorosilane, b. 34–52°/15 mm. | 21.0 | 23.8 |
| tris (trifluoroethoxy) chlorosilane, b. 53–68°/14 mm. | 9.2 | 9.8 |
| high boiling residue (presumably containing tetra (trifluoroethoxy) silane) |  |  |

An additional fraction boiling at 105–110°/120 mm. and analyzing 14% Cl was obtained from this distillation; these values, when considered in connection with the details of preparation, identify the fraction as ethoxy trifluoroethoxy dichlorosilane.

In a similar way the reaction is carried out with other 1,1-dihydroperfluoro alcohols to produce the corresponding mono-, di-, tri- and tetra-carbinoxy silanes. Silicon tetrachloride is commonly employed as the second reactant, although other halides, e.g. silicon tetrabromide, are operable. However, since the halogen is ordinarily removed either during the reaction or during subsequent application of the resulting compound, the less expensive chlorine compound is preferred. Other compounds of silicon and chlorine, e.g. $Si_2Cl_6$, are also applicable but thus far have been found to be of secondary importance. Silanes containing both alkoxy and halogen radicals attached to silicon, e.g. diethoxy dichlorosilane, are also reactive with the 1,1-dihydroperfluoro alcohols, with the production of the corresponding alkoxy fluoroalkoxy silanes or halosilanes.

The 1,1-dihydroperfluoro alcohols are conveniently prepared from the corresponding acid or acid halide, e.g. by reduction with lithium aluminum hydride. Trifluoroacetic acid may be prepared according to the method first described by Swarts, including the conversion of benzotrichloride to benzotrifluoride followed by nitration, amination and oxidation of the benzene ring. This acid, as well as higher acids, is obtainable by electrochemical fluorination as described in Simons Patent No. 2,519,983. Examples of typical 1,1-dihydroperfluoro alcohols suitable for reaction with silicon halides in accordance with my invention are listed in the following table, together with their approximate boiling points in degrees C. at 740 mm.

| Compound: | B. ° C./740 mm. |
| --- | --- |
| $CF_3CH_2OH$ | 73. |
| $C_2F_5CH_2OH$ | 80. |
| $C_3F_7CH_2OH$ | 95. |
| $C_4F_9CH_2OH$ | 111. |
| $C_5F_{11}CH_2OH$ | 128. |
| $C_6F_{13}CH_2OH$ | 144. |
| $C_7F_{15}CH_2OH$ | 160. |
| $C_8F_{17}CH_2OH$ | 176. |
| $C_9F_{19}CH_2OH$ | 192, m. 87° C. |
| $C_{10}F_{21}CH_2OH$ | 209. |

Example 4

Silicon tetrachloride, 0.05 mol, was mixed with 0.1 mol of alpha picoline and 300 ml. of anhydrous diethyl ether, and the mixture was cooled in an ice bath while adding 0.1 mol of 1,1-dihydroperfluorobutyl alcohol dropwise and with continuous stirring. The mixture was filtered to remove the picoline hydrochloride, and distilled. One fraction boiled at 104° C./40 mm. to 105° C./25 mm. and on analysis was found to contain 53.8% fluorine and 8% chlorine. A further fraction boiled at 150–176° C./27 mm., analyzed 56.3% fluorine and 1.7.% chlorine, and presumably contained some partially hydrolyzed and partially polymerized residues as well as some of the di-alkoxy, tri-alkoxy, and tetra-alkoxy compounds previously described in connection with Example 1. This latter fraction, which was a clear limpid liquid, was stored for several months in a loosely stoppered flask and was found to be converted, by slow hydrolysis, to a glass-clear, water-white, hard, brittle resinous polymer having a refractive index of about 1.30–1.31 and having the recurring group $$(R_fCH_2O)_xSiO_{\frac{4-x}{2}}$$

where $R_f$ is a fluorinated alkyl radical, in this case a perfluoropropyl radical, and the value of $x$ on the average is greater than one and less than three.

Example 5

The product obtained from a reaction of silicon tetrachloride and 1,1-dihydroperfluorobutyl alcohol as described in connection with Example 4 was carefully fractionated. A 4-gram portion of the fraction boiling at 84–92° C./28 mm. was mixed with 11.15 grams of dibutyl ether and 0.05 ml. of water and shaken for several hours at normal room temperature. A soft gel-like polymer was produced, which when dried could be cured to a solvent-resistant rubbery state.

Another portion on analysis was found to contain 14.0% chlorine, the calculated chlorine content of $(C_3F_7CH_2O)_2SiCl_2$ being 14.3%. In general, the dichloro compounds are found to provide softer polymers, whereas the inclusion of substantial proportions of the trichloro compounds ordinarily results in harder, more brittle polymeric products. The monochloro compounds by themselves form dimers on hydrolysis of the halogens, and in conjunction with the more highly halogenated compounds result in shortening of the polymeric chains by providing end groups. However, the fluorine-containing alkoxy radicals are also susceptible of hydrolysis from the silicon atom of such compounds under more drastic conditions, and solid polymers may be obtained from mixtures containing both tri-alkoxy and tetra-alkoxy silanes as hereinbefore disclosed.

Example 6

A mixture of fluoro-organic silane materials prepared as described in connection with Example 3 was fractionated and a material boiling at 68–78° C./14 mm. and analyzing approximately 14% chlorine was recovered. A portion was subjected to slow hydrolysis by permitting it to stand for several months in a loosely stoppered flask, producing a glass-clear, water-white, hard and brittle resinous polymer. The polymer analyzed 4.27% carbon, 9.1% fluorine, and 32% silicon. A lump of the polymer was unchanged when heated to a dull red in a flame. It slowly evaporated when the temperature was increased to a bright red. Another lump was found to be unchanged on boiling in water for 72 hours. It was soluble in anhydrous hydrogen fluoride.

Example 7

Silicon tetrachloride 14.2 grams, alpha-picoline 31 grams, dry heptane 100 ml., and 1,1-dihydroperfluorohexyl alcohol 100 grams, were combined according to the method described under Example 4 and the product mixture fractionated. A fraction boiling at 54–60° C./12 mm. was washed with water, dried, and redistilled in a molecular still at a plate temperature of 60–160° C. and a vacuum of $10^{-4}$ mm. to remove a volatile portion, leaving a viscous oily residue which on long storage in a loosely stoppered flask was converted to a glass-like polymer containing about 9% carbon and about 25% fluorine as shown by analysis.

Example 8

A sample of diethoxy dichlorosilane, prepared in reasonably pure form from silicon tetrachloride and ethyl alcohol in the presence of alpha-picoline, was reacted with twice its molar quantity of 1,1-dihydroperfluorobutyl alcohol, again in the presence of alpha-picoline, to provide a liquid product boiling at 186–200° C./740 mm., having a refractive index of $N_D^{25}=1.315$, and consisting mainly of diethoxy-bis(1,1-dihydroperfluorobutoxy) orthosilicate. Prolonged storage in a loosely stoppered flask resulted in formation of a hard glass-like polymer having a refractive index in the neighborhood of 1.3, i.e., significantly lower than that of silica.

The fluoro-organo-silicon halide compounds of this invention are extremely hygroscopic. They fume extensively when exposed to the air. As noted in the examples, they absorb sufficient moisture from the air to cause hydrolysis even when stored in loosely stoppered flasks, e.g. when the flask is closed with a cork rather than a rubber stopper. The hydrolyzed product likewise is seen to be unstable and to undergo condensation polymerization, with splitting out of water. Such hydrolysis and condensation is presumably intensified by the presence of small amounts of acid resulting from initial hydrolysis of the silicon halide.

Under severe conditions, complete hydrolysis of a small portion of the starting compounds is obtained, and the resulting polysiloxane is found to contain a small proportion of $SiO_2$ groups in addition to the recurring groups having the general formula $$(R_fCH_2O)_xSiO_{\frac{4-x}{2}}$$

Surprisingly, however, the $R_fCH_2O-$ radicals of these polymers are highly resistant to hydrolysis. In some instances, as in Example 9, some few additional groups, e.g. ethoxy groups, may also be attached to the siloxane skeletal chain; but in all cases the polymeric product has recurring groups of the general formula just indicated, and the properties of the polymer are largely dependent on the presence of such groups. For example, the refractive indices of these polymers are significantly lower than that of silica.

Hydrolysis and condensation of impure fluorinated carbinoxy silane compounds or mixtures of this invention containing small amounts of unreacted silicon tetrachloride or the like also results in the formation of polysiloxanes containing skeletal $SiO_2$ groups in addition to the recurring $$(R_fCH_2O)_xSiO_{\frac{4-x}{2}}$$

groups.

As hereinbefore indicated, fluoro-organo-silicon halides having only a single halogen atom attached to silicon may be incorporated in order to provide terminal groups. In the absence of such compounds, the polymeric chains normally terminate in hydroxyl groups. In some cases, ring compounds may be formed by condensation between terminal hydroxyls at opposite ends of a polymeric skeletal chain.

In the foregoing discussion of polymeric bodies, where hydrolysis and polymerization by condensation of hydroxyl groups is illustrated, it will be apparent that ammonolysis and condensation of amine groups will provide analogous results. However the process involves more expensive reagents, results in products which are more likely to be reactive, and in general is less desirable, at least at the present time, than the siloxane-type polymers.

This application is a continuation-in-part of my co-pending application Serial No. 287,799, filed May 14, 1952, and now abandoned.

I claim:

1. As new compositions of matter, carbinoxy silane compounds having the generic formula:

$$(R_fCH_2O)_xSiX_{4-x}$$

where "$R_f$" is a fluorinated alkyl radical containing only carbon and fluorine atoms, X is a member of the class consisting of halogen atoms and amino groups, and x is 1–4.

2. Carbinoxy silane compounds having the formula:

$$(C_nF_{2n+1}CH_2O)_xSiX_{4-x}$$

where X is a member of the class consisting of halogen atoms and amino groups, x is 1–4, and n is an integer from one to ten.

3. Carbinoxy silane compounds having the formula:

$$(C_nF_{2n+1}CH_2O)_xSiCl_{4-x}$$

where x is 1–3 and n is an integer from one to ten.

4. Carbinoxy silane compounds having the formula:

$$(C_nF_{2n+1}CH_2O)_xSi(NH_2)_{4-x}$$

where x is 1–3 and n is an integer from one to ten.

5. Carbinoxy silane compounds having the formula:

$$(C_nF_{2n+1}CH_2O)_4Si$$

where n is an integer from one to ten.

6. Carbinoxy silane compounds having the formula:

$$(C_nF_{2n+1}CH_2O)_xSiX_{4-x}$$

where X is a member of the class consisting of halogen atoms and amino groups, x is 1–4, and n is an integer from three to ten.

7. 1,1-dihydroperfluorobutoxy trichlorosilane.

8. Bis (1,1-dihydroperfluorofluorobutoxy) dichlorosilane.

9. Tris (1,1-dihydroperfluorobutoxy) monochlorosilane.

10. 1,1-dihydroperfluorobutyl silicate.

11. Compounds of the formula $(RCH_2O)_ySiCl_{4-y}$ wherein R is a lower perfluoroalkyl radical and y is an integer from 1 to 3.

12. A polymeric product, containing the Si—O—Si siloxane linkage and having a low refractive index, obtained by reacting small amounts of water with fluorinated carbinoxysilicon chloride material having the formula $(R_fCH_2O)_xSiCl_{4-x}$ wherein $R_f$ is a fluorinated alkyl radical containing only carbon and fluorine atoms and $x$ is 1–3, and permitting the reaction product to polymerize.

References Cited in the file of this patent

UNITED STATES PATENTS

| | | |
|---|---|---|
| 2,643,964 | Smith-Johannsen | June 30, 1953 |
| 2,777,870 | McBee et al. | Jan. 15, 1957 |
| 2,778,758 | Henning | Jan. 22, 1957 |